United States Patent [19]
Kitaguchi

[11] 3,758,154
[45] Sept. 11, 1973

[54] PLASTIC SADDLE FOR BICYCLE

[75] Inventor: Katuhiko Kitaguchi, Osaka, Japan

[73] Assignee: Taihei Industries Co., Ltd., Osaka-fu, Japan

[22] Filed: Nov. 30, 1971

[21] Appl. No.: 203,265

[52] U.S. Cl. .............................. 297/214, 297/203
[51] Int. Cl. ............................................. B62j 1/08
[58] Field of Search .................... 297/195, 214, 203, 297/196, 197, 198, 211, 212, 213

[56] References Cited
UNITED STATES PATENTS

| 742,479 | 10/1903 | Newey | 297/195 |
|---|---|---|---|
| 2,244,956 | 6/1941 | Miller et al. | 297/195 UX |
| 3,258,290 | 6/1966 | Karbin | 297/203 |
| 3,432,204 | 3/1969 | Brilando | 297/214 |
| 3,622,200 | 11/1971 | Bird | 297/195 |

FOREIGN PATENTS OR APPLICATIONS

| 1,120,177 | 4/1956 | France | 297/214 |
|---|---|---|---|
| 957,725 | 8/1949 | France | 297/214 |

*Primary Examiner*—James T. McCall
*Attorney*—James E. Armstrong et al.

[57] ABSTRACT

A plastic saddle comprises a plastic saddle top and a plastic support therefor. The saddle top is gently inclined upward, extends sidewise in width, has a peripheral flange and is provided on its back face with a thick abutting portion in front and two thick abutting portions at rear opposite sides. The support principally comprises two support strips which are spaced apart sidewise by a greater distance at their rear portions than at their upwardly inclined front portions providing an abutment corresponding to the front abutting portion of the saddle top. The rear portions are abruptly inclined upward and are formed at their ends with abutments extending sidewise in facing relation to the rear abutting portions of the saddle top. Extending between the abutments and the outer walls of the support strips are reinforcing plates approximately triangular as seen from the rear. The support strips are interconnected by a deflection preventing plate in the vicinity of the reinforcing plates. The saddle top is supported on the support at three points by face-to-face contact between the corresponding abutting portions and abutments with these parts detachably secured together by connecting means such as bolts and nuts. At an intermediate portion of the support strips means is provided for fixedly mounting the saddle on the seat post at an adjustable angle.

3 Claims, 12 Drawing Figures

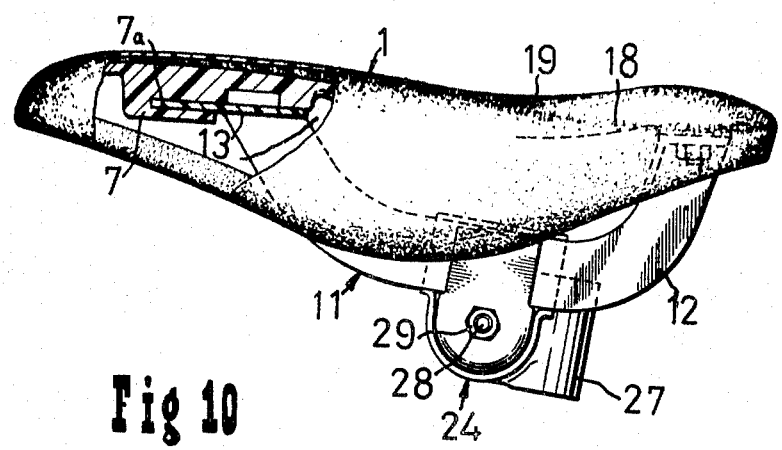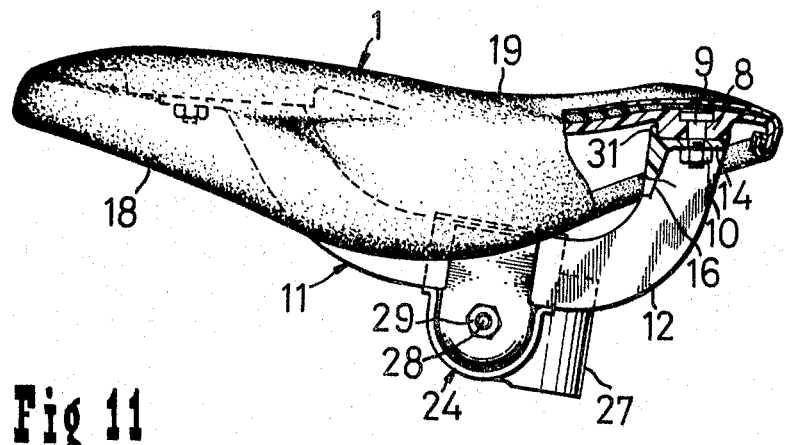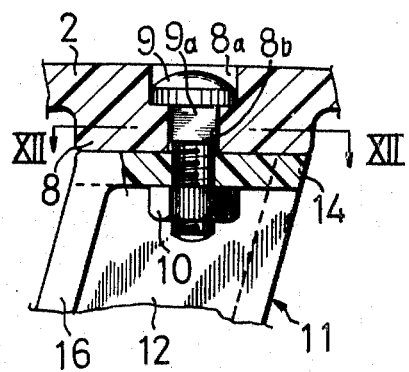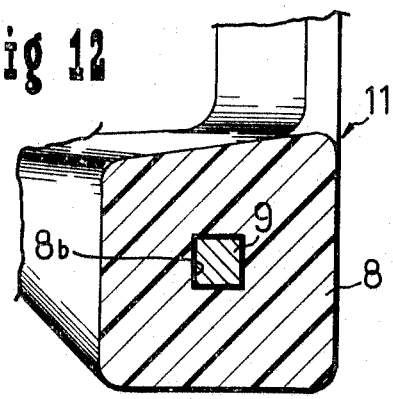

PLASTIC SADDLE FOR BICYCLE

BACKGROUND OF THE INVENTION

The present invention relates to improvements in saddles for bicycles, more particularly to a saddle made of a plastic material.

As already known, the saddle for bicycles includes a saddle top and a support member for supporting the saddle top and is mounted on a seat post approximately horizontally. The saddle of the type generally used comprises a saddle top made of a sheet of shaped leather such as cowhide and provided with a back plate and a nose piece reveted thereto for providing metal base wires therebetween. Also widely used is a metal saddle which comprises a steel saddle top, a cushion member placed over the upper surface of the saddle top, a vinyl cover covering the upper surface of the cushion member and a support member made of steel wire or steel plate provided on the back face of the saddle top. However, saddles made of leather have problems in that the material is not readily available and is not fully satisfactory in its water resistance, strength and ornamental effects. For this reason, metal saddles comprising a steel saddle top are used extensively, but since metal saddles are very uncomfortable to seat on, it has been a general practice to cover the upper surface of the saddle top with a layer of a cushion material such as rubber or sponge with a vinyl cover provided over the surface of the cushion layer. In the case where a cushion material is used for a metal saddle, it is noted that the cushion material is compressed with a high ratio of compression, so that in order to ensure the comfort of seating when riding a bicycle, it is necessary to use a cushion material of a considerable thickness, this resulting in further drawback that when it is not straddled on, namely when it is unloaded, the cushion material which is returned to the original state makes the saddle unattractive in appearance.

Further in manufacturing the steel saddle top, the special shape of the saddle including bent portions requires several steps of working for shaping and a subsequent step of rust prevention such as plating to result in a cost increase. These drawbacks in the manufacture are also encountered with support members made of a steel wire and plate. In assembling a saddle comprising steel saddle top and support members of steel wire or plate, a nose piece and a back plate for securing support members have to be reveted to the front and rear of the saddle top. To improve the comfort of seating, moreover, it is further necessary to mount front and rear springs. Thus assemblage requires a very complicated procedure which can only be conducted with a low efficiency. In addition, such saddle causes great difficulties in providing a lightweight bicycle in which there is a growing interest in recent years.

Accordingly, it has been desired to provide a plastic saddle composed of a saddle top and support member which are molded of a plastic material. Plastic saddles heretofore known may generally be classified into two groups: one wherein the saddle top and support member are integrally made by injection molding and the other that is made up of a saddle top and support member which are separately molded and joined together for example by bolts and nuts.

These saddles made of a plastic material have verious outstanding advantages over the leather and metal saddles in that they are simple to manufacture and resistant to weather and rust and well-fit for a lightweight bicycle.

In spite of these advantages, the plastic saddle of the former type has a problem in respect of changeability of the saddle top with the support member. Moreover, the difference in shape due to the fact that the respective members serve entirely different purposes requires complex dies and skill for molding. Accordingly, it is difficult to obtain dies which will fully meet the requirements of the saddle. On the other hand, the saddle of the latter type which is composed of separately molded saddle top and support member is superior with respect to molding and skill required for molding and its amenability to the requirements for the saddle of bicycle, provided that the separate members, i.e., saddle top and support member are joined together with ingenious means. It is noted that when the bicycle is driven by the person straddling on the saddle, he pushes down the pedals alternately urging the saddle top and support member into slipping action relative to each other, with the result that the connections between the two members are subjected to a heavy load due to the slipping action. This is particularly true when the bicycle is abruptly brought to a halt. At this time, a slipping action takes place which tends to cause displacement toward the direction of the advance of the bicycle. The connection must then withstand such a heavy load.

The saddle top and support have heretofore been joined together by fastening members such as bolts and nuts. Apparently, these fastening members are not fully satisfactory.

Furthermore, even if both members are satisfactorily joined together securely, it is strictly required that the support member per se be fully capable of withstanding a load and vibration, because the saddle top has to ensure the comfort of seating in a stable state and the load and vibration to which the saddle top is subjected are to be supported solely by the support member.

SUMMARY OF THE INVENTION

The present invention relates to a novel and practical saddle for bicycles made of a plastic material devised in the light of the foregoing technical background.

Accordingly, an object of the present invention is to provide a saddle wherein the saddle top and support member are separately molded of a plastic material for the ease of die molding and the surfaces of both constituent members to be joined together are formed with abutting portions and abutments for contact with each other so as to make the saddle top comfortable to seat on and to enable the support member to satisfactorily support the load, the support member thus being capable of withstanding vibration, slippage and the heaviest load which will act in the vertical direction.

Another object of this invention is to provide a saddle which is useful in providing a lightweight bicycle and wherein the cushion material to be provided on the surface of the saddle top can be rendered as thin as possible to provide an attractive appearance, the saddle top thus having a sufficient cushion properties in itself.

Another object of this invention is to provide a saddle assembly which does not require a particular procedure such as plating for the prevention of rust and corrosion and wherein the saddle top and the support member can be assembled with ease at the abutting surfaces thereof, both members further being rendered interchangeable.

Another object of this invention is to provide a saddle which is so adapted that various external forces to be exerted on the support will be transmitted to the seat post of the bicycle without possible deformation or damage when it is subjected to such external forces and which is adjustable to the desired angle with respect to the seat post.

Still another object of this invention is to provide a saddle wherein the saddle top is formed with ribs transversely extending at an intermediate portion and a rear portion, the rear rib interconnecting the rear abutting portions, other ribs further extending between the intermediate rib and the rear rib longitudinally and gradually sidewise so as to prevent deformation of the rear portion of the saddle top to be subjected to the greatest load and impart good cushion properties to this portion and to thereby make the saddle comfortable to straddle on.

These and other objects of this invention will be fulfilled by the saddle to be described below. The saddle of this invention comprises a saddle top made of a plastic material and a support detachably supporting the saddle top and made of a plastic material. The saddle top is gently inclined upward and longitudinally bent, extends sidewise in width, has a peripheral flange and is provided on its back face with a thick abutting portion in front and two thick abutting portions at rear opposite sides. The support principally comprises two support strips which are spaced apart sidewise by a greater distance at their rear portions than at their upwardly inclined front portions providing an abutment corresponding to the front abutting portion of the saddle top. The rear portions are abruptly inclined upward and are formed at their ends with abutments extending sidewise in facing relation to the rear abutting portions of the saddle top. Between the abutments and the outer walls of the support strips there are provided reinforcing plates approximately triangular as seen from the rear. The two support strips are further interconnected by a deflection preventing plate in the vicinity of the reinforcing plates. The saddle top is supported on the support by face-to-face abutting contact between the corresponding abutting portions and abutments and these abutting parts are secured together by connecting means such as bolts and nuts. The support strips of the support are further provided with means including holders formed with radial grooves in the opposing inner faces and a loop clip formed on its outer faces with radial grooves in conformity with the abovementioned grooves and having an opening for receiving the seat post, the holders and the loop clip being connected together by bolts and nuts whereby the saddle is made adjustable to the desired angle with respect to the seat post.

BRIEF DESCRIPTION OF THE DRAWINGS

FIG. 9 is a side elevation with part broken away to show another embodiment of means for abutting connection between the saddle top and support;

FIG. 10 is a side elevation with part broken away to show another embodiment of the same, the view showing substantially improved means;

FIG. 11 is a side elevation on an enlarged scale showing the abutting connection between the saddle top and the support; and FIG. 12 is a view in section taken along the line XII—XII in FIG. 11, the illustrated portion being seen in the direction of the arrows.

DETAILED DESCRIPTION OF THE INVENTION

Figure 1:
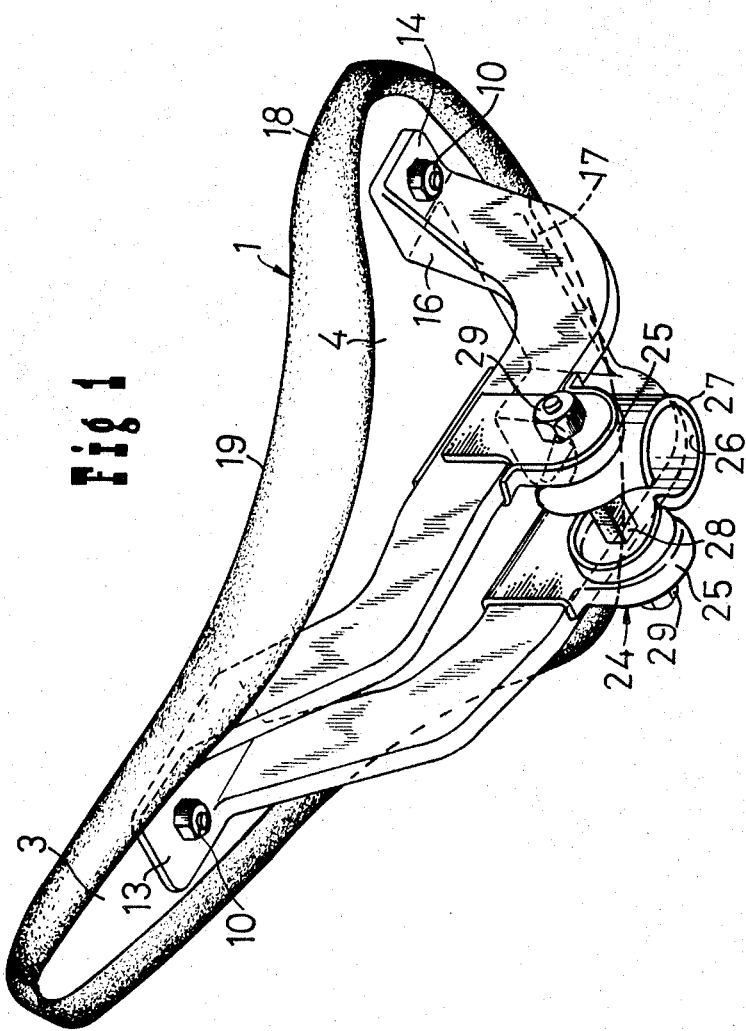
FIG. 1 is a perspective view showing a saddle of this invention in its entirety as it is seen from a lower position in front.
Figure 2:
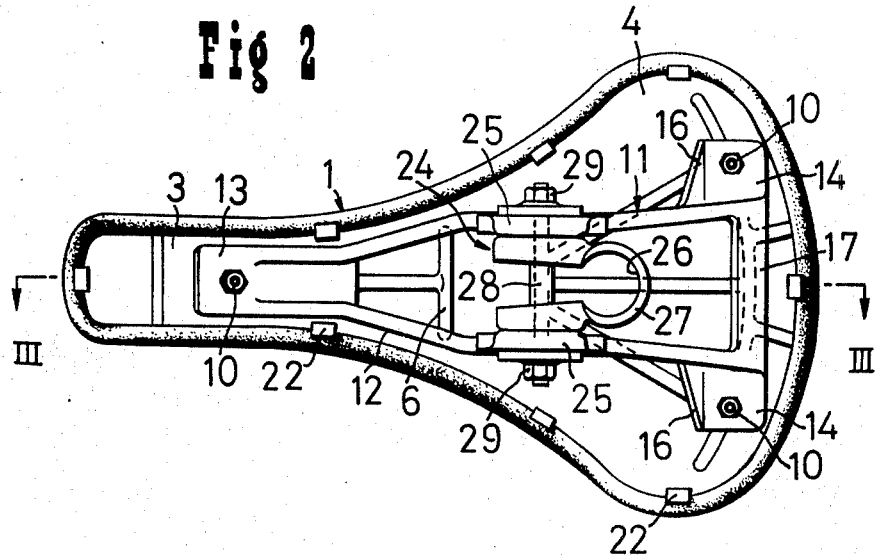
FIG. 2 is a plan view of the bottom of the saddle.
Figure 4:
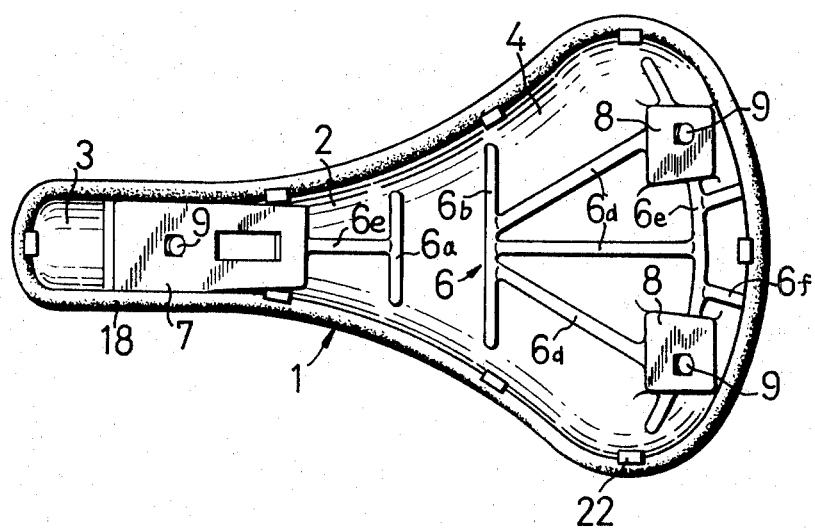
FIG. 4 is a plan view showing the bottom of the saddle with a support removed.
Figure 6:
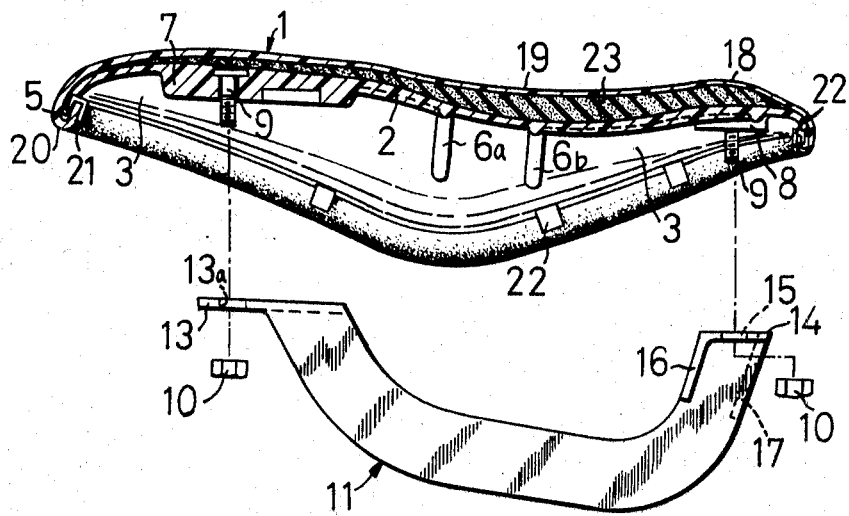
FIG. 6 is a view in side elevation showing the saddle top in longitudinal section taken along its center line and the support as it is to be assembled with the saddle top.

Referring to the drawings, a saddle indicated at 1 in its entirety comprises a saddle top 2 gently bending in a longitudinal direction and made of a plastic material, i.e., nylon 6. The saddle top 2 includes a front portion 3 and a rear portions 4 as seen in FIGS. 1, 2 and 4 and a downwardly extending peripheral flange 5 as shown in FIG. 6. The saddle top 2 is gently inclined upward to provide the front portion 3 and rear portion 4 and is formed with reinforcing or cushion rib means 6 by injection molding as illustrated in FIG. 4. More specifically, it will be seen from FIG. 4 that two transverse ribs 6a and 6b are spaced apart by a predetermined distance at an intermediate portion of the saddle top 2 and, at the rear portion 4, a curving rib 6c extends sidewise along the bent peripheral flange 5. The curving rib 6c interconnects rear abutting portions to be described later. Three radial ribs 6d extend from the midportion of the rib 6b radially in the longitudinal direction to the curving rib 6c. A longitudinal rib 6e extends from the transverse rib 6a toward the front. Extending further rearward from the curving rib 6c are radial ribs 6f. The transverse ribs 6a and 6b resist the deflection of the saddle top 2 which is most prominent substantially between the transverse ribs 6a and 6b with respect to its longitudinal direction. Since no rib is interposed between the ribs 6a and 6b, a suitable cushioning effect is obtained at this position. The ribs 6b and 6c coact to withstand the greatest load which is exerted substantially on the rear portion 4. Since there is no transverse rib between both ribs 6b and 6c but the ribs 6d extend radially in a longitudinal direction, an inward deflection about the peripheral flange of the portion 4 will be produced under the control of the ribs 6b and 6c to impart a cushioning effect to the portion 4.

Besides ribs 6, the saddle top 2 is further formed with an abutting portion 7 and two abutting portions 8 at the center of rear face of the front portion 3 and at the sides of rear face of the rear portion 4 respectively, the abutting portions projecting from the remaining portion in a greater thickness. As representatively shown by the abutting portion 8 in FIGS. 11 to 12, each of the abutting portions 7, 8 and 8 is formed in its front face with a cavity 8a for receiving therein the head of a round-headed bolt from which extends a square hole 8b. A rounded-head bolt 9 having a square neck 9a fits into the hole 8b with its threaded stem projecting from the rear face of the top. By means of the bolts 9 and nuts 10, the saddle top 2 is detachably mounted on a support 11 made of a plastic material.

Figure 3:
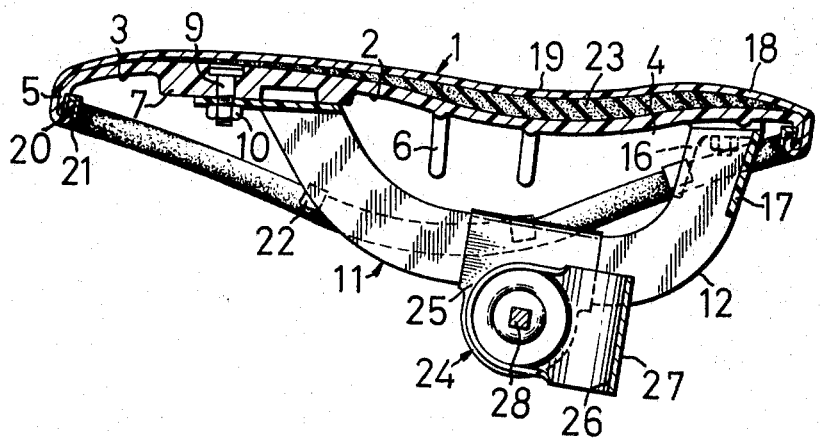
FIG. 3 is a view in section taken along the line III—III in FIG. 2.
Figure 5:
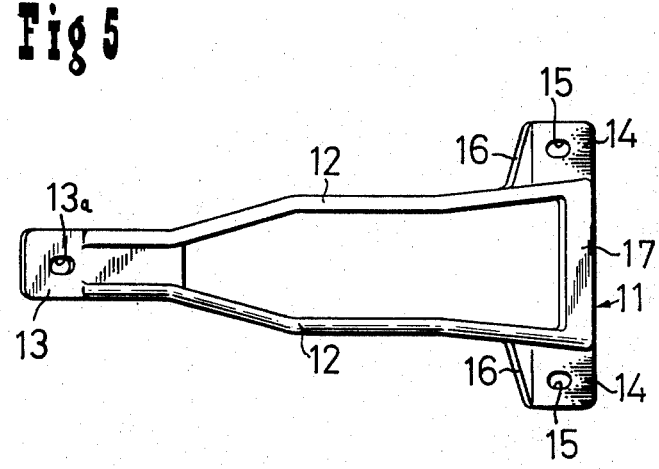
FIG. 5 is a plan view showing the bottom of the support.

The support 11 is made of nylon 6 and produced by injection molding and has at its center a loop clip for receiving and holding the upper end of the seat post (not shown). As shown in FIGS. 1, 5 and 6, the support 11 comprises two support strips 12 of a rectangular section which are spaced apart by a greater distance in rear than in front. The front portion of the support is bent upward as seen in FIG. 6 and has an abutment 13 at the ends of the both strips 12, 12. The abutment 13 has a slightly oval hole 13a. The rear portions of the support strips 12, 12 are bent approximately at a right angle and extend upward. Extending outward from the outer walls of the strips 12, 12 at their ends are two abutments 14, 14 which are formed with slightly oval holes 15 respectively. These abutments 13, 14 and 14 are in corresponding relation with the abutting portions 7, 8 and 8 as seen in FIG. 6. When the saddle top 2 is mounted on the support 11 as shown in FIGS. 1 and 3, the abutting portions 7, 8 and 8 come into face-to-face fitting contact with the abutments 13, 14 and 14, so that the vertical load exerted on the saddle top 2 is supported by the support 11 at three points. To protect the abutting portions of the saddle top against deformation, these portions have a greater thickness than the other portions. The portions fitting with each other by the face-to-face contact are joined together by the square-necked bolts 9 and nuts 10 to secure the saddle top 2 to the support 11. Since the neck of the bolt 9 fits into the square hole 8b, the bolt 9 is locked in place. Thus even if the saddle top 2 is subjected to vibration and external forces, the bolt 9 is prevented from rotation to secure the saddle top 2 to the support 11. Instead of securing the saddle top 2 to the support 11 at the three connecting positions all by bolts 9 and nuts 10, the front abutting portion 7 may be formed with an opening 7a for receiving the abutment 13 as shown in FIG. 9, and the front abutment 13 of the support may be inserted into the opening 7a in abutting contact therewith. Such arrangement permits easy assemblage and will fully withstand vibration or load.

Furthermore the saddle top 2 mounted on the support 11 is longitudinally adjustable in its position relative to the saddle top 2. For this purpose, the holes 13a, 15 are provided in the abutments 13, 14 and 14 of the support 11 in the form of a longitudinally extending groove. Although not shown, it is possible to provide three grooves 13a in front.

When the saddle top 2 mounted on the support 11 is subject to a vertical load, i.e., when the person is seated on the saddle 1, the load is received by the support 11 at the three abutting positions. Accordingly, the support 11 must be fully capable of resisting the load and the resulting sidewise deflection or deformation. For this purpose, reinforcing plates 16, 16 approximately triangular as seen from the rear are formed between the rear outer walls of the support strips 12, 12 and the rear abutments 14, 14 (see FIGS. 1 and 7) whereby the vertical load delivered onto the abutment 14, 14 is satisfactorily supported. At the rear ends of the support strips 12, 12 near the reinforcing plates 16, 16, there is provided a deflection preventing plate 17 for connecting the support strips 12, 12 to prevent sidewise deflection thereof at their rear ends. The front abutment 13 prevents sidewise deflection of the support strips 12, 12 at their front ends.

To complete the saddle 1, there is provided a cover 18 made preferably of a suitable vinyl material. When seen in a plan view, the cover 18 resembles a saddle top 2 but is slightly greater and comprises a top wall 19, a substantially vertical peripheral wall 20 and a bent portion 21 which are integrally made as already known. The bent portion 21 is folded inside over the peripheral flange 5 of the saddle top 2 and a thin metal wire disposed along the peripheral edge of bent portion 21 of the cover 18 is caught on metal members 22 ]-shaped in section and fixed to the flange 5.

In providing the cover 18 over the upper surface of the saddle top 2, there is disposed a cushion member 23 made of a spongy material having a greater thickness in the rear of the top wall 19 and a smaller thickness in front as shown in FIGS. 3 and 6. Since the saddle top 2 and the support 11 are made of a plastic material, the spongy material 23 can be as thin as possible to give an attractive appearance to the saddle 1 due to a highly compressive properties thereof.

The saddle top 2 thus provided with the cover 18 is assembled with the support 11 by bolts 9 and nuts 10, with the abutting portions 7, 8, 8 brought into corresponding relation with the abutments 13, 14, 14 for face-to-face contact therebetween.

The saddle assembled are fixedly mounted on the seat post of a bicycle in approximately horizontal position. However, since the inclination of the seat post differs with the kind of bicycle, the saddle 1 may be provided with angle controlling means accordingly.

Means for mounting the saddle 1 on the seat post is indicated at 24 in its entirety in FIGS. 1 to 3. The mounting means includes holders 25 mounted at an intermediate portion of the support strips 12, 12 and respectively formed with radial grooves in the opposing inner faces. Disposed between the holders 25 is a loop clip 27 having radially grooved outer faces in conformity with the foregoing grooved faces and a hole 26 for receiving the seat post 26. A bolt 28 threaded at opposite ends and having a square section is passed through the mounting means, which is then fastened by nuts 29, 29. For this purpose, square openings are formed in the holders 25 and loop clip 27 in alignment. The position of the loop clip 27 relative to the holders 25 is determined by the engagement between the radially grooved faces thereof, this permitting the saddle to be secured to the seat post at an adjustable angle as desired.

It will be apparent from the foregoing description that when the bicycle is driven by a person seated on the saddle 1, the resulting vertical load is fully supported by the face-to-face contact between the abutting portions 7, 8 and 8 of the saddle top 2 and the abutments 13, 14 and 14 of the support 11, and the load delivered to the support is satisfactorily supported also by the reinforcing plates 16 and the deflection preventing plate 17, thereby protecting the saddle from deformation or damage. Further front abutment 13 and the deflection preventing plate 17 fully prevent the support 11 from sidewise deflection to be otherwise caused by the load and enables the same to resist a vibration load.

Figures 7, 8:
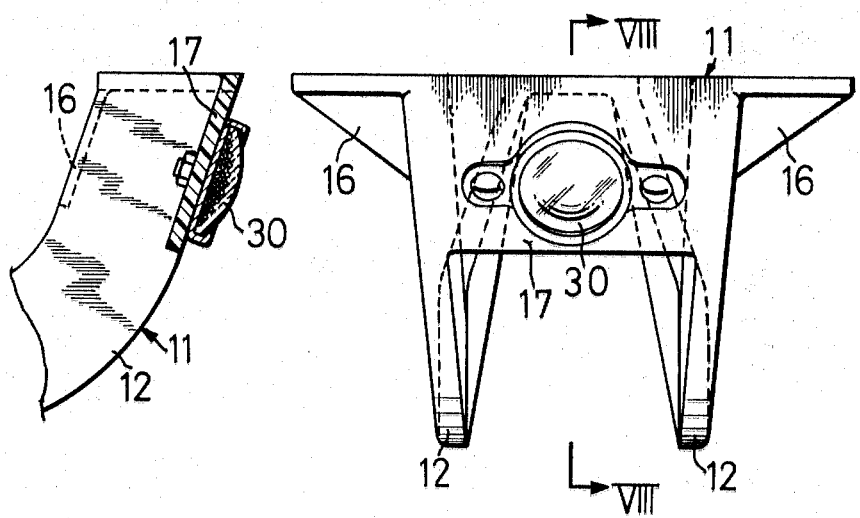
FIG. 7 is a rear view of another useful modified embodiment of the support.
FIG. 8 is a fragmentary view in section taken along the line VIII—VIII in FIG. 7.

As shown in the embodiment of FIGS. 7 and 8, the deflection preventing plate 17 may be equipped with a reflector 30 secured thereto by bolts and nuts. The reflector 30 will then indicate during nighttime the position of the bicycle to other vehicles running in the rear thereof.

Referring to FIG. 10, there is shown projection 31 extending upward from the front of the rear abutments 14, 14 of the support 11. The projection is engaged with the stepped portions of the rear abutting portions 8, 8 of the saddle top 2, which serves to prevent the forward slippage that will take place longitudinally of the saddle top 2 especially when the brake is suddenly actuated when running a bicycle.

Although the present invention has been described with reference to the foregoing embodiments, various alterations can of course be made without departing the spirit and scope of this invention.

What is claimed is:

1. A plastic saddle for a bicycle comprising a saddle top made of a plastic material and a support made of plastic material for said saddle top, said saddle top being gently inclined upward and longitudinally bent, extending sidewise in width, having a peripheral flange and being provided on its back face with a thick abutting portion in front and two thick abutting portions at rear opposite sides thereof, said support being principally composed of two support strips spaced apart sidewise by a greater distance at their rear portions than at their upwardly inclined front portions, the rear portions of said support strips being provided with an abutment corresponding to the front abutting portion of said saddle top, the rear portions of said support strips being abruptly inclined upward and formed at their ends with abutments extending sidewise in facing relation to the rear abutting portions of said saddle top, the abutments and the outer wall of said support strips being provided with reinforcing plates extending therebetween and approximately triangular as seen from the rear, said two support strips being interconnected by a deflection preventing plate in the vicinity of the reinforcing plates, said saddle top being supported on the support at three points by face-to-face abutting contact between the corresponding abutting portions and abutments with the abutting parts detachably secured together by connecting means, said support strips being provided at an intermediate portion with means for fixedly mounting said saddle on the seat post at an adjustable angle.

2. The plastic saddle for a bicycle as set forth in claim 1 wherein a projection extends from the rear abutments of said support and is engaged with the rear abutting portions of said saddle top.

3. The plastic saddle for a bicycle as set forth in claim 1 wherein transverse ribs extending sidewise are spaced apart by a predetermined distance at an intermediate portion of said saddle top and a curving rib interconnecting the rear abutting portions are provided in the rear of said saddle top, with radial ribs extending longitudinally from the transverse rib in the rear to the curving rib.

* * * * *